J. KOLODZIEJ.
YEAST CUTTING DEVICE.
APPLICATION FILED NOV. 16, 1908.

920,345.

Patented May 4, 1909.

Witnesses:

Inventor:
Joseph Kolodziej
By
Attorney.

UNITED STATES PATENT OFFICE.

JOSEPH KOLODZIEJ, OF CHICAGO, ILLINOIS.

YEAST-CUTTING DEVICE.

No. 920,345.    Specification of Letters Patent.    Patented May 4, 1909.

Application filed November 16, 1908. Serial No. 462,927.

*To all whom it may concern:*

Be it known that I, JOSEPH KOLODZIEJ, a citizen of the United States, residing at Chicago, county of Cook, and State of Illinois, have invented certain new and useful Improvements in Yeast-Cutting Devices, of which the following is a specification.

My invention relates to yeast cutting devices.

The object of my invention is to provide a device of the character mentioned which shall be of such construction as to be adapted to facilitate the cutting of yeast as received in bulk from the wholesaler by the retailer, that is, the grocer or a like retailer, into retailable cakes of a uniform size.

A further object of my invention is to provide a device of the character mentioned, which shall be strong and durable, simple of construction, hence of low cost to manufacture.

Other objects will appear hereinafter.

With these objects in view, my invention consists generally in a rectangular, slitted box of such dimensions as to adapt the same to exactly receive the ordinary prismatic cakes sold by the wholesaler to the retailer, the slits provided in the sides of said box being adapted to act as guides for a cutter preferably a cord, thereby making it possible to easily and quickly divide said bulk cake into smaller retailable cakes of a uniform size.

My invention further consists in certain details of construction and arrangements of parts all as will be hereinafter fully described and particularly pointed out in the claims.

Figure 1:
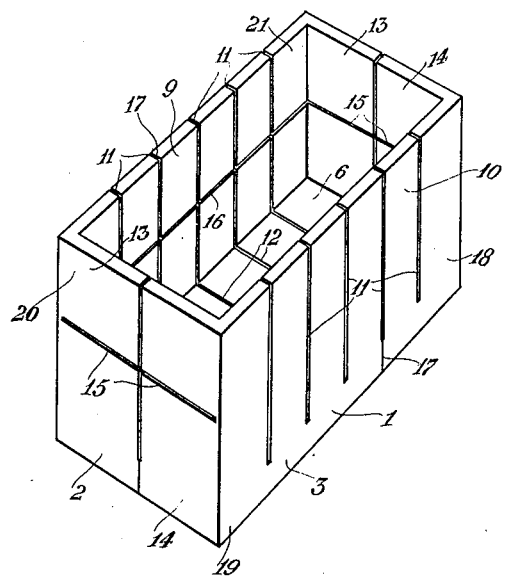
Figure 2:
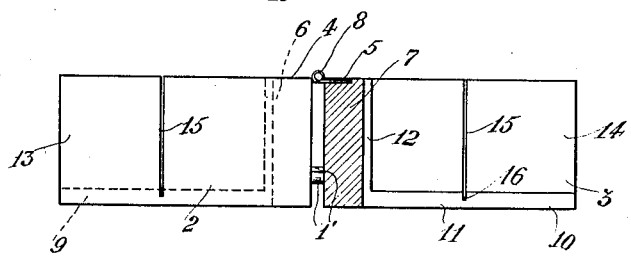
Figure 3:
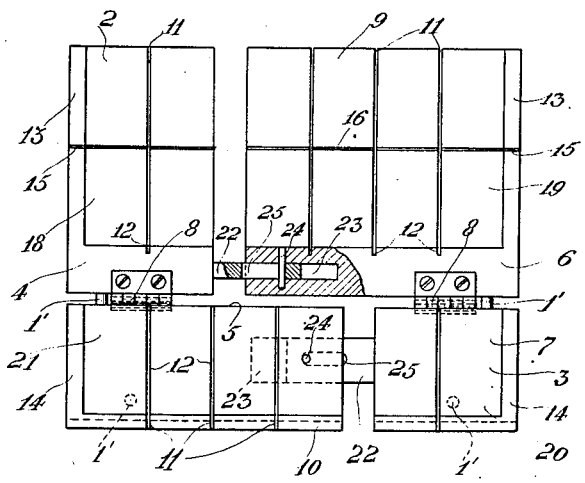

My invention will be more readily understood by reference to the accompanying drawings forming a part of this specification, and in which, Figure 1 is a perspective view of the preferred form of my device in closed position, Fig. 2 illustrates the same in opened position, one part thereof being shown in section, and Fig. 3 is a side elevation thereof, one part being shown vertically disposed, the other being shown in a horizontal position.

Referring now to the drawings, my invention is comprised in a preferably rectangular box or receptacle 1 open at its upper side, the same being preferably formed of wood, although any other suitable material may be employed. 1' indicates base pins or leg supports for said receptacle. Said receptacle is formed of two identical parts or halves 2 and 3, the contiguous edges 4 and 5 of the bottom portions 6 and 7, respectively of said parts being hingedly connected as at 8. Each of the vertically extending longitudinal or side walls 9 and 10, respectively, of said parts 2 and 3, is provided with a plurality of vertically extending slits 11, said slits being equally spaced apart therein, those provided in the wall 9 being in transverse alinement with those provided in the wall 10. Said slits are of such a width as to snugly receive the cord ordinarily used by grocers. The bottom portions 6 and 7 of said parts 2 and 3 are each provided with a plurality of alining transversely extending slits 12 passing only part way through said bottom, as clearly shown in Figs. 2 and 3, alining of said slits 12 and pairs of said vertically extending slits 11 provided in the walls 9 and 10 lying in identical vertical planes. The end walls 13 and 14 of said parts 2 and 3, respectively, are provided midway between the upper edges thereof and the upper surfaces of the bottom portions 6 and 7 of said parts with transversely, that is, horizontally extending, slits 15, the slits provided in the contiguous end portions being in horizontal alinement. Provided in the side walls 9 and 10 connecting said slits 15, that is, lying in the same horizontal plane of said slits, are slits 16 passing only part way through said walls, as clearly shown in Fig. 2.

With the provision of a receptacle of a construction as thus far described, it is evident that by the employment of an ordinary cord or other means adapted to be received in the slits provided in said receptacle, a cake of yeast contained in said receptacle may readily and quickly be cut into smaller cakes all of uniform dimensions. Now in order to facilitate the ready removal of said smaller cakes, I so construct my receptacle that the same may be longitudinally extensible or enlargeable. With this object in view I divide the parts 2 and 3 of the receptacle as at 17 simply into parts 18 and 19, and 20 and 21. I provide each of said parts 18 and 20 with a preferably rectangular tenon 22 slidably resting in a mortise 23 provided in each of the parts 19 and 21 for the reception of the same, as clearly shown in Fig. 3. Pins 24 one being provided in each of the parts 19 and 21 extending through slots 25 provided in the tenons 22 obviously limit the relative movement of said parts. By such provision it is evident that upon dividing the bulk cake of yeast into smaller cakes as before described, the receptacle may, by grasping the end portions thereof, be readily extended or enlarged, thereby obviously facilitating the ready removal of said cakes.

While I have shown what I deem to be the preferable form of my device, I do not wish to be limited thereto as there might be many changes made in the details of construction and arrangements of parts without departing from the spirit of my invention. And although I have designed my device with special reference to yeast cutting, I may use the same in any other connection, as for example for cutting butter or a like substance into smaller cakes, to which it is applicable.

Having thus described my invention what I claim as new, and desire to secure by Letters Patent, is:

1. A device of the class described, consisting of a two part receptacle hingedly connected, the vertical walls thereof being provided with vertically and horizontally extending slits, the bottom thereof being provided with slits adjoining the vertically extending slits of said vertical walls, substantially as and for the purpose specified.

2. A device of the class described, consisting of a two part rectangular hingedly connected receptacle, the vertical walls thereof being provided with vertically and horizontally extending slits, said vertically extending slits being equally spaced apart therein, said horizontally extending slits being disposed midway between the upper edge and the bottom of said receptacle, the bottom of said receptacle being provided with slits adjoining the vertically extending slits of said vertical walls, substantially as and for the purpose specified.

3. A device of the class described, consisting of a two part rectangular receptacle, the parts thereof being in hinged connection, the vertical walls thereof being provided with vertically and horizontally extending slits, said vertically extending slits being equally spaced apart therein, the horizontally extending slits of the longitudinal walls of said receptacle extending only partially through said walls, the bottom of said receptacle being provided with slits extending only partially therethrough, said slits adjoining the vertically extending slits of said vertical walls, substantially as and for the purpose specified.

4. A device of the class described, consisting of a two part rectangular receptacle, the bottom portion of the parts thereof being in hinged connection, the vertical walls thereof being provided with vertically and horizontally extending slits, the bottom thereof being provided with slits adjoining the vertically extending slits of said vertical walls, means provided in each of the parts of said receptacle whereby said receptacle may be longitudinally enlarged or extended, substantially as and for the purpose specified.

5. A device of the class described, consisting of a two part rectangular receptacle, the bottom portions of the parts thereof being in hinged connection, the walls thereof being provided with slits, each of said parts being formed into sections, said sections being in slidable mortised connection, substantially as and for the purpose specified.

6. A device of the class described, consisting of a two part rectangular receptacle, contiguous edges of the bottom portions of the parts thereof being in hinged connection, the walls of said receptacle being provided with slits, each of said parts being formed into two sections, a tenon projecting from the bottom of one of the sections of each of said parts slidably resting in a mortise provided in each of the other of said sections whereby said receptacle may be longitudinally extended or enlarged, substantially as and for the purpose specified.

In witness whereof I have signed my name to this specification in the presence of two subscribing witnesses.

JOSEPH KOLODZIEJ.

Witnesses:
 JANET E. HOGAN,
 HELEN F. LILLIS.